June 21, 1966 R. C. SEIWERT 3,256,669
SANDWICH PANEL
Filed Oct. 8, 1963

INVENTOR.
ROBERT C. SEIWERT
BY *Watts & Fisher*
ATTORNEYS

United States Patent Office 3,256,669
Patented June 21, 1966

3,256,669
SANDWICH PANEL
Robert C. Seiwert, Wooster, Ohio, assignor to Ohio Metalsmiths Corporation, Wooster, Ohio, a corporation of Ohio
Filed Oct. 8, 1963, Ser. No. 314,681
7 Claims. (Cl. 52—615)

This invention relates to vehicle construction and more particularly to a reinforced metal panel assembly for doors, for trucks or trailers and the like and a method for fabricating same.

One of the problems involved in fabricating reinforced, strong, rigid metal panels suitable for doors is that of achieving a thin and light structure which is economical to fabricate and requires relatively small amount of material.

Other problems involved in the fabrication of reinforced panels is that of simplicity of construction, workmanlike appearance and economy while providing the required rigidity.

Briefly, in accordance with aspects of this invention, an improved reinforced metal panel assembly is made by using a pair of metal panels and an intermediate core of suitable material such as plywood, balsa, masonite, wallboard, aluminum, or any of the other light metals, the panels being joined to produce a "compressive interference fit" between the panels and the core. The metal panels may be designated as an inner and an outer panel depending on their intended position in a finished structure.

In making the panel assembly, the core material is first stamped, or cut, with a series of through relief holes in a predetermined pattern. The inner panel may be of steel or any other commercially available metal and is embossed in accordance with the pattern which was employed to cut relief holes in the core material. The depth of these embossments is approximately equal to the thickness of the core material. Next, the inner panel and the core material are compressively brought into engagement with the outer or face panel to form areas of contact between the outer surfaces of the embossments and the inner face of the outer panel. The embossments, or faces, may now be welded to the outer panel to compressively hold the core material between the two metal panels. Advantageously, this compression is both transverse and longitudinal relative to the panel assembly. With this novel structure, the core material is securely held in position and is placed under bi-directional compression. The perimeter of the inner and outer panels is now joined. For example, they may be welded or mechanically fastened by nuts and bolts, but preferably they are joined by forming a return flange joint by folding the face panel over the other of the panels in the area of their peripheries and then welding the two together.

Accordingly, it is an object of this invention to provide an improved reinforced metal panel assembly suitable for vehicle doors and the like.

Another object of this invention is to provide an improved method for making a reinforced metal panel assembly.

A still further object of this invention is to provide an improved reinforced metal panel assembly which is relatively thin, rigid, and light, but at the same time has a clean, smooth appearance.

These and various other objects and features of the invention will be more clearly understood from a reading of the detailed description of the invention in conjunction with the drawing in which.

Figure 1:
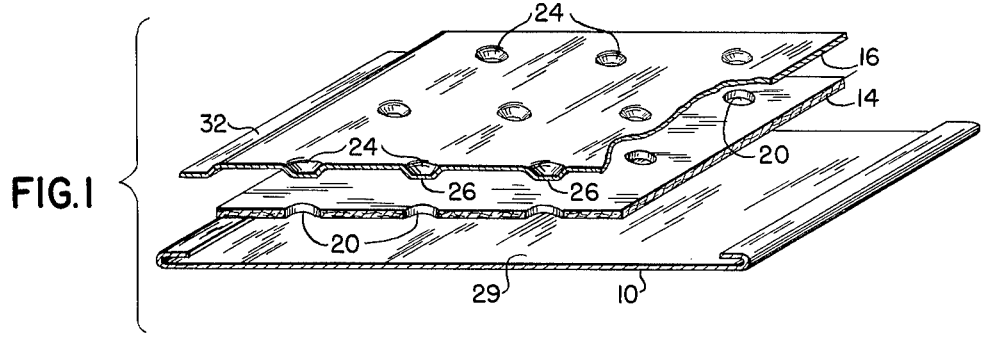
FIGURE 1 is an exploded perspective view of one illustrative embodiment of this invention.
Figure 2:
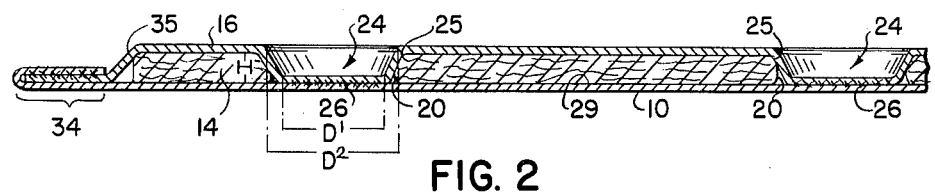
FIGURE 2 is a view, in section, of a portion of the illustrative embodiment of FIGURE 1 to a larger scale; and, FIGURE 3 is a view, in perspective, of a door panel assembly in accordance with this invention.

Referring now to FIGURE 1, there is depicted an exploded perspective view of one illustrative embodiment of this invention. As depicted there, the elements of a panel assembly include a smooth outer face panel 10, core 14, and a back panel 16. When these elements are joined in accordance with this invention, the result is a unitary reinforced panel assembly of greatly improved construction which is shown in section to an enlarged scale in FIGURE 2.

In constructing the panel assembly, the core is first stamped, or otherwise formed, with a plurality of holes 20 spaced about the area of the core in accordance with a predetermined pattern. Preferably the holes are relatively small in comparison with the area of the remainder of the panel. For example, in one illustrative embodiment, the holes are circular and of the order of one inch in diameter. The holes are spaced apart approximately four inches measured to the embossment centers. This core is of the order of one-eighth of an inch in thickness and formed of fir plywood. The panels are of 24 gauge cold rolled steel and the resultant thickness of the completed panel is of the order of two-tenths of an inch and its weight per square foot is of the order of two and one-half pounds.

In making the back panel, a series of frusto-conical embossments 24 are stamped or otherwise formed in a pattern corresponding with the pattern used to make the holes in the core 14. The embossments 24 are formed with a smaller diameter, $D_1$, which is preferably smaller than the diameter of the holes 20 in the core 14 and with a larger diameter, $D_2$, which is preferably larger than the diameter of the holes 20. For example, the diameter of the holes 20 may be 1.00 inch and $D_1$ and $D_2$ may be .906 inch and 1.06 inches, respectively. The height H of the embossments is approximately equal to, and preferably slightly less than, the thickness of the core material 14. Thus the sloping surfaces of the embossments 24 force the core material away from the axis of the embossments in a compressive interference fit at 25, FIGURE 2, when the core is pressed into engagement with, or mounted on the face panel 16. These specific physical arrangements of the sizes and spacings of the embossments are, of course, arbitrary and any particular size of embossments and spacings between embossments may be employed as long as a compressive interference fit is obtained. A compressive interference fit between the back panel and the core is obtained when the sloping walls of the embossments compress the core.

After the core 14 is mounted on the back panel 16, embossment surfaces 26 are brought into engagement with inner surface 29 of the face panel 10. The panels are then connected together as by spot welding these areas of contact. The back and face panels are also joined about their peripheries 32 and 34, respectively. The peripheries are joined by overlapping the edges of the outer panel over the edges of the inner panel outside of the area occupied by the core 27 and the overlapped edges may be permanently connected such as by spot welding. Ideally, further compressive interference is provided at 35 around the periphery of the core 14. With this described construction the face panel 10 is smooth and free of imperfections that might mar its appearance.

While other materials may be employed, cold rolled steel is particularly advantageous for the panels and these panels may be of the same gauge. For example, gauges in the order of 20 to 24 are suitable for use in this panel construction and other gauges may be employed depending upon the physical requirements of the panel.

Different types of cores may be employed. For example, core material may be plywood, balsa, masonite, wallboard, aluminum, or any of the light metals available. Fir plywood has been found to be particularly advantageous because of its strength, durability, and cost and it may be used in thicknesses of the order of one-eighth of an inch and three-sixteenths of an inch depending upon the permissible weight per square foot of the resulting panel, the over all thickness permitted by the other factors of the structure, and the strength required.

It should be noted that while panels of greater thickness may be employed in some applications, one of the great advantages of this described construction is that for any given strength requirement a panel made according to this invention is considerably thinner than prior art panels. Thus, for example, in a refrigerator a wall of one inch thickness might replace a conventional four inch wall and in the disclosed trailer door a panel of three-sixteenths of an inch thickness will replace a one inch panel.

Figure 3:
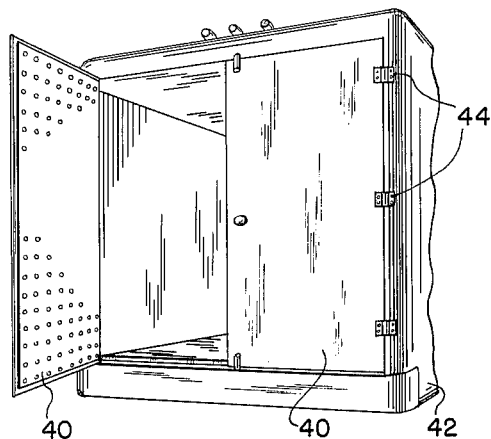

FIGURE 3 shows the panel assembly in its preferred use as a door 40 of a vehicle 42. This specific panel assembly is particularly suitable for such doors because it provides a relatively sturdy construction which is a savings of weight and an improvement from the standpoint of rigidity over the prior art devices. These panels, when employed as doors, have been found to be more economical, capable of better wear, and exhibit insulating properties over the prior art devices. The door 40 may be mounted on the panel body 42 by means of suitable hinges 44 of any convenient type well known in the art.

While I have shown and described one illustrative embodiment of this invention, it is understood that the concepts of this invention could be applied to other embodiments without departing from the spirit and scope of this invention.

What is claimed is:
1. A composite panel assembly comprising:
    (a) a smooth, flat, metal face panel having inner and outer surfaces;
    (b) a rigid core having apertures and front and back surfaces with the front surface abutting the majority of the face panel inner surface and the face panel projecting outwardly from the periphery of the core about its circumference;
    (c) a back panel abutting the core back surface;
    (d) the back panel having a plurality of embossments each projecting into a different one of the apertures and contacting the face panel inner surface, the embossments being fixed to the face panel;
    (e) said embossments and said core forming a plurality of compressive interference fits at junctures of the core back surfaces and the walls defining said apertures.
2. A vehicle door comprising:
    (a) a smooth, flat, metal face panel having inner and outer surfaces;
    (b) a plywood core having apertures and front and back surfaces with the front surface abutting the majority of the face panel inner surface with the face panel projecting outwardly from the periphery of the core about its circumference;
    (c) a back panel abutting the core back surface;
    (d) the back panel having a plurality of frusto-conical embossments each projecting into a different one of the apertures and contacting the face panel inner surface, the embossments being fixed to the face panel;
    (e) each of said embossments and said core forming a compressive interference fit at the periphery of each aperture adjacent the core back surface; and,
    (f) the face panel being folded back over the periphery of the back panel and welded to the back panel.
3. The door of claim 2 wherein the back panel is in compressive interference fit with the core around the perimeter of the core and adjacent the core back surface.
4. The panel assembly of claim 1 wherein the apertured core is formed of plywood.
5. The panel assembly of claim 1 in which the embossments of the back panel are frusto-conical in shape.
6. The panel assembly of claim 1 in which the apertured core is formed of plywood and the embossments of the back panel are frusto-conical in shape.
7. The panel assembly of claim 6 wherein the panels are joined at their peripheries.

References Cited by the Examiner

UNITED STATES PATENTS

| | | | |
|---|---|---|---|
| 678,903 | 7/1901 | Rapp | 52—619 |
| 1,784,511 | 12/1930 | Carns | 52—574 |
| 2,633,441 | 3/1953 | Buttress | 161—112 X |
| 2,752,279 | 6/1956 | Alderfer | 161—111 |
| 2,781,820 | 2/1957 | Rogers | 161—112 X |
| 2,839,442 | 6/1958 | Whitaker | 156—213 |
| 3,020,986 | 2/1962 | Kirk et al. | 52—621 |
| 3,031,358 | 4/1962 | Rutter et al. | 181—34 X |
| 3,072,520 | 1/1963 | Groth | 156—213 |

FRANK L. ABBOTT, *Primary Examiner.*

RICHARD W. COOKE, JR., EARL J. WITMER,
*Examiners.*

R. S. VERMUT, *Assistant Examiner.*